US006856575B2

(12) United States Patent
Jones

(10) Patent No.: US 6,856,575 B2
(45) Date of Patent: Feb. 15, 2005

(54) MONITORING A MICROSEISMIC EVENT

(75) Inventor: Robert Hughes Jones, Falmouth (GB)

(73) Assignee: ABB Offshore Systems Limited, Nailsea (GB)

( * ) Notice: Subject to any disclaimer, the term of this patent is extended or adjusted under 35 U.S.C. 154(b) by 0 days.

(21) Appl. No.: 10/690,374

(22) Filed: Oct. 21, 2003

(65) Prior Publication Data

US 2004/0125695 A1 Jul. 1, 2004

(30) Foreign Application Priority Data

Oct. 21, 2002  (GB) .............................................. 0224439

(51) Int. Cl.$^7$ ................................................. G01V 1/28
(52) U.S. Cl. ............................... 367/38; 367/43; 702/17
(58) Field of Search ........................ 367/38, 43; 702/17

(56) References Cited

U.S. PATENT DOCUMENTS

| | | | | |
|---|---|---|---|---|
| 4,649,524 A | * | 3/1987 | Vance | .......................... 367/13 |
| 5,774,419 A | * | 6/1998 | Uhl et al. | ...................... 367/38 |
| 5,934,373 A | * | 8/1999 | Warpinski et al. | ........ 166/250.1 |
| 6,462,549 B1 | * | 10/2002 | Curtis et al. | ................. 324/323 |
| 6,653,839 B2 | * | 11/2003 | Yuratich et al. | ............ 324/355 |

FOREIGN PATENT DOCUMENTS

| | | | |
|---|---|---|---|
| SU | 1488742 A | * | 6/1989 |
| SU | 001734061 | | 5/1992 |

* cited by examiner

*Primary Examiner*—Ian J. Lobo
(74) *Attorney, Agent, or Firm*—Bracewell & Patterson, L.L.P.

(57) ABSTRACT

A method of monitoring a microseismic event includes detecting the event to produce a first signal dependent on the event. The first signal includes noise at a frequency of, for example 50 Hz. A first sample of the first signal is taken. Then a second sample of the first signal is taken, the second sample occurring n/f seconds after the first sample, where n is an integer (e.g. 1). Subtracting the first and second samples from each other produces a farther signal dependent on the event in which the noise has been at least partly compensated for.

10 Claims, No Drawings

MONITORING A MICROSEISMIC EVENT

CROSS-REFERENCE TO RELATED APPLICATION

This application claims the benefit of United Kingdom Patent Application No. 0224439.0, filed on Oct. 21, 2002, which hereby is incorporated by reference in its entirety.

TECHNICAL FIELD OF THE INVENTION

The present invention relates to monitoring a microseismic event.

BACKGROUND OF THE INVENTION

Microseismic data is continuously received from microseismic sensors fitted in producing fluid wells, such as hydrocarbon producing fluid wells. Triggering algorithms are an important aspect of microseismic monitoring in that they are the mechanism by which the microseismic signals are detected. Algorithms are required that can discriminate between background noise that may vary with time, and microseismic signals that may also vary between events. The algprithms run in real-time so simplicity of computation is also an advantage.

Microseismic monitoring in producing fluid fields, for example oil fields, may require monitoring in the presence of high levels of electrical noise. One source of electrical noise comes from the use of electrical currents for cathodic protection, particularly of the items in a well borehole. The cathodic protection current is DC, which is typically derived from an AC mains supply by rectification. This leads to a DC current that contains frequency peaks typically at 50 Hz, 100 Hz., etc. This large, peaky current invariably finds its way into the electrical outputs of the sensors and can make finding microseismic signals difficult.

There are several types of well known existing seismic triggers. The simplest is just the detection of a signal level change. A more sophisticated trigger is to look for a level change that occurs across several separate stations within a pre-defined time window. Another variation on this is to use a long term/-short term average to cause a trigger. This is just the short-term average of a rectified signal divided by the long-term average of the rectified signal. The ratio of long-term to short-term is typically around a factor of nine.

In the presence of the multi-frequency noise described above, neither of the trigger algorithms described in the previous section is effective. What is required is an accurate model of the noise that, although it is well characterized locally, does change over time.

SUMMARY OF THE INVENTION

According to the present invention, there is provided a method of monitoring a microseismic event, comprising: detecting said event to produce a first signal dependent on said event, the first signal including noise at a frequency of f Hz; taking a first sample of said first signal; taking a second sample of said first signal, the second sample occurring n/f seconds after the first sample, where n is an integer; and subtracting the first and second samples from each other to produce a further signal dependent on said event in which said noise has been at least partly compensated for.

The integer could be 1.

The frequency f Hz could be 50 Hz for example, or a harmonic of 50 Hz.

The method could be one in which the microseismic event is one occurring in a fluid producing well.

DESCRIPTION OF THE PREFERRED EMBODIMENT

In one example, although the noise contains all harmonics of, typically, 50 Hz, it has been found that by subtracting the current sample from a sample that occurred 20 milliseconds before, typically well over 90% of the noise energy is removed. An existing trigger detection algorithm can then be used and levels of detection become similar to those that are achieved when no noise is present. This approach works because all the noise spikes are harmonics of the typically 50 Hz fundamental, which is a property of the rectification process that is used in creating the DC.

What is claimed is:

1. A method of monitoring a microseismic event, comprising: detecting said event to produce a first signal dependent on said event, the first signal including noise at a frequency of f Hz; taking a first sample of said first signal; taking a second sample of said first signal, the second sample occurring n/f seconds after the first sample, where n is an integer; and subtracting the first and second samples from each other to produce a further signal dependent on said event in which said noise has been at least partly compensated for.

2. A method according to claim 1, wherein n=1.

3. A method according to claim 1, wherein f=50.

4. A method according to claim 1, wherein the microseismic event is one occurring in a fluid producing well.

5. A method according to claim 1, wherein a source of the noise signal is a cathodic protection direct-current (DC) derived from an alternating current main supply by rectification.

6. A method of monitoring a microseismic event, the method comprising the steps of:
   detecting a microseismic event to produce a first signal dependent on said event, the first signal including a noise signal produced by cathodic protection currents having a frequency of f Hz;
   taking a first sample of said first signal;
   taking a second sample of said first signal, the second sample taken n/f seconds after the first sample; and
   determining a difference between the first and second samples to produce a third signal dependent on said microseismic event in which said noise signal has been at least partly removed.

7. A method according to claim 6, wherein a source of the noise signal is a cathodic protection direct-current (DC) derived from an alternating current main supply by rectification.

8. A method according to claim 7, wherein f is approximately 50 Hz.

9. A method according to claim 8, where n is an integer, and wherein n=1.

10. A method of monitoring a microseismic event in a fluid producing well, comprising the steps of:
    rectifying an AC main supply to produce DC current, the DC current containing a noise signal having a base frequency f Hz equivalent to the frequency of the AC main supply and harmonics thereof;
    detecting a microseismic event to produce a first signal dependent on said event, the first signal including the noise signal;
    taking a first sample of said first signal;
    taking a second sample of said first signal, the second sample taken n/f seconds after the first sample;

determining a difference between the first and second samples to produce a third signal dependent on said microseismic event in which said noise signal has been at least partly removed; and applying the third signal to an existing trigger detection algorithm to detect the microseismic event.

* * * * *